United States Patent
DiGiovanni et al.

(10) Patent No.: US 6,768,847 B2
(45) Date of Patent: Jul. 27, 2004

(54) DISPERSION COMPENSATING MODULE AND FIBER FOR CONTROL OF RESIDUAL DISPERSION

(75) Inventors: David John DiGiovanni, Montclair, NJ (US); William A. Reed, Summit, NJ (US); Man F. Yan, Berkeley Heights, NJ (US); Lars Gruner-Nielsen, Bronshoj (DK); Susanne Dyrbol, Haslev (DK)

(73) Assignee: Fitel USA Corp., Norcross, GA (US)

(*) Notice: Subject to any disclaimer, the term of this patent is extended or adjusted under 35 U.S.C. 154(b) by 60 days.

(21) Appl. No.: 10/098,679

(22) Filed: Mar. 15, 2002

(65) Prior Publication Data

US 2003/0174981 A1 Sep. 18, 2003

(51) Int. Cl.[7] .............................. G02B 6/26; G02B 6/02; H04J 14/02
(52) U.S. Cl. .................... 385/123; 385/27; 385/124; 398/81
(58) Field of Search .................... 385/123–128

(56) References Cited

U.S. PATENT DOCUMENTS

| | | | |
|---|---|---|---|
| 5,448,674 A | | 9/1995 | Vengsarkar et al. |
| 5,838,867 A | | 11/1998 | Onishi et al. |
| 6,304,691 B1 | * | 10/2001 | Espindola et al. ............. 385/24 |
| 6,421,167 B1 | * | 7/2002 | Cohen et al. ................ 359/337 |
| 6,453,102 B1 | * | 9/2002 | Dong et al. .................. 385/123 |
| 6,498,887 B1 | * | 12/2002 | Gruner-Nielsen et al. .. 385/123 |
| 6,501,892 B1 | * | 12/2002 | Okuno et al. ................ 385/127 |
| 6,654,531 B2 | * | 11/2003 | Gruner-Nielsen et al. .. 385/123 |
| 6,654,564 B1 | * | 11/2003 | Colbourne et al. ......... 398/147 |
| 2002/0159119 A1 | * | 10/2002 | Fries et al. ................. 359/161 |
| 2002/0159735 A1 | * | 10/2002 | Edvold et al. .............. 385/127 |
| 2002/0164138 A1 | * | 11/2002 | Saitou et al. ............... 385/127 |
| 2003/0007760 A1 | * | 1/2003 | Goyal et al. ................ 385/123 |
| 2004/0031419 A1 | * | 2/2004 | Taniguchi et al. ........ 106/31.59 |

FOREIGN PATENT DOCUMENTS

| | | |
|---|---|---|
| WO | WO 99/42869 | 2/1999 |
| WO | WO 01/55756 | 8/2001 |
| WO | WO 01/77727 | 10/2001 |
| WO | WO 02/21173 | 3/2002 |

* cited by examiner

Primary Examiner—Akm Enayet Ullah
Assistant Examiner—Tina M Lin
(74) Attorney, Agent, or Firm—Priest & Goldstein, PLLC

(57) ABSTRACT

A dispersion compensating fiber and module are described for controlling residual dispersion in a dispersion compensated system. The dispersion compensating fiber is designed with dispersion curve having an inflection point at a wavelength near the optical transmission operating wavelength region. The dispersion curve, having an inflection point near the operating wavelength region, produces a relative dispersion slope that closely matches the relative dispersion slope of the transmission fiber over a relatively wide bandwidth surrounding the operating wavelength region.

18 Claims, 7 Drawing Sheets

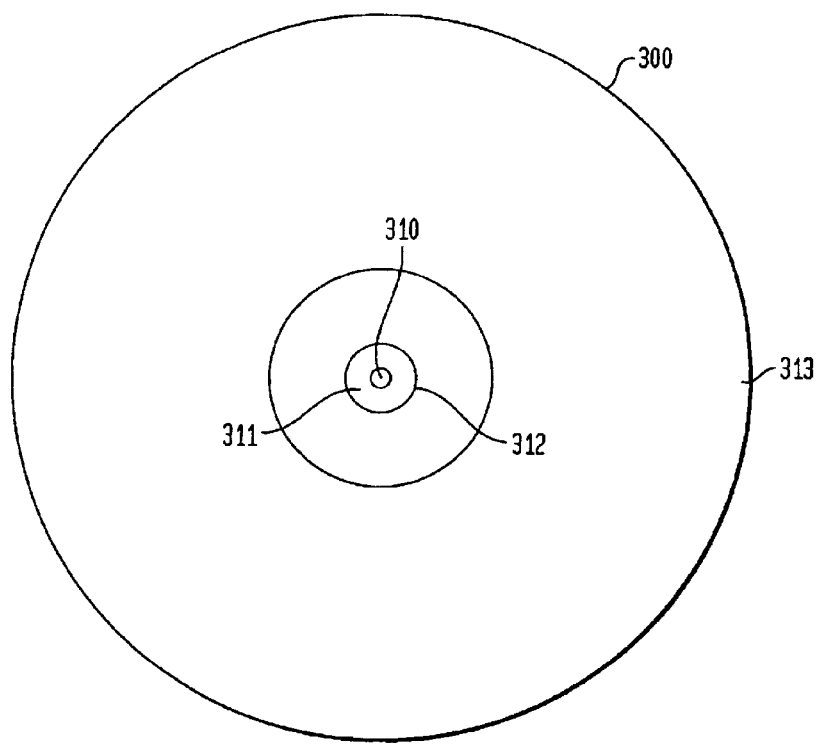
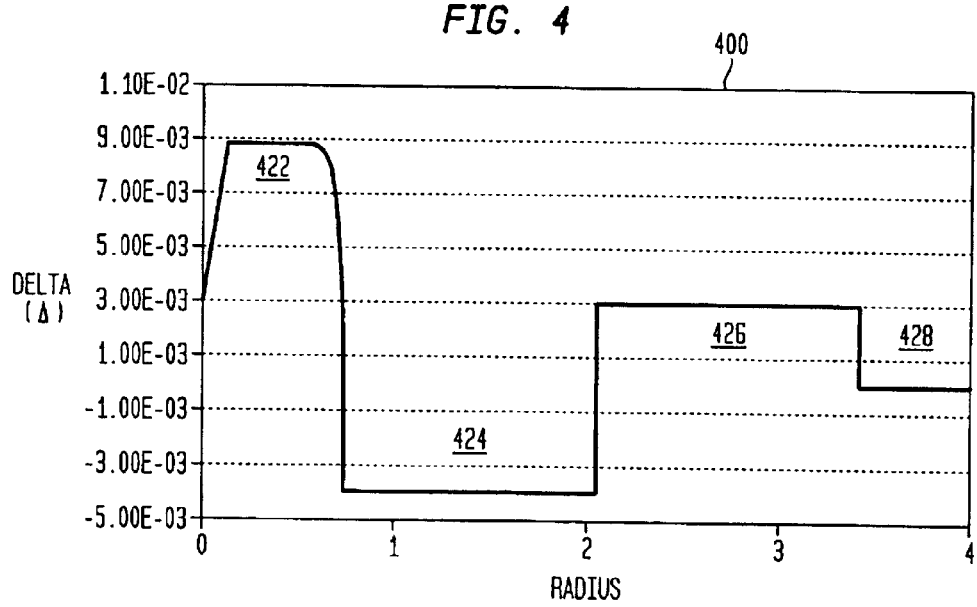

DISPERSION COMPENSATING MODULE AND FIBER FOR CONTROL OF RESIDUAL DISPERSION

BACKGROUND OF THE INVENTION

1. Field of the Invention

The present invention relates generally to improvements to optical fiber, and more particularly to advantageous aspects of a dispersion-compensating fiber and associated module for controlling residual dispersion.

2. Description of the Prior Art

In an optical telecommunication transmission system, as an optical signal travels along an optical fiber over several kilometers, the optical signal pulse begins to spread, potentially overlapping into an adjacent pulse time slot. This phenomenon, known as wavelength dispersion, can seriously affect the integrity of the signal if not corrected before detection. More recently, the development of high speed/high bit rate systems, such as a 40 Gbit/s (DWDM), requires even greater control of dispersion compensation.

A recently developed class of optical fibers known as dispersion-compensating fiber (DCF), have steeply sloped, negative dispersion characteristics. One use for DCF is to undo the pulse spreading which occurs in fibers of positive dispersion. This is achieved by concatenating segments of fiber with positive and negative dispersion. For example, the dispersion characteristics of a DCF can be optimized to match those of already existing optical fiber links fabricated from standard single-mode fibers (SSMF) for operation over broad wavelength regions. This technique is disclosed in U.S. patent application Ser. No. 09/596,454, filed on Jun. 19, 2000, assigned to the assignee of the present application, the drawings and disclosure of which are hereby incorporated by reference in their entirety.

Conventional DCF's typically have a dispersion versus wavelength curve, such as curve 100 shown in FIG. 1, which has a relatively large curvature. Typical transmission fibers such as standard single mode fiber (SMF), LEAF™, and Truewave™ fibers are more linear with positive slope. As a result, the residual dispersion curve, after compensation of the SMF with the DCF also has curvature, as shown in curve 200 of FIG. 2. This curvature is unacceptable for next-generation transmission systems. For example, for a 40 Gbit/s system operating over 800 km, the residual dispersion must be kept within a 15 ps/nm window, but as seen in FIG. 2, compensation fiber consistent with curve 200 is within 15 ps/nm for wavelengths only from about 1545 nm to 1595 nm.

The dispersion, as well as the dispersion slope, of a positive dispersion transmission fiber can be compensated over a range of wavelengths by matching the relative dispersion slope (RDS) of the DCF to that of the transmission fiber, where RDS is the ratio of dispersion slope (S) to dispersion (D):

$$RDS = S/D$$

By using a combination of two different DCFs, very accurate control of the RDS can be achieved. However, matching the RDS of DCF to that of the transmission fiber compensates for dispersion at only one wavelength and there remains significant dispersion, referred to as residual dispersion, for wavelengths surrounding that one wavelength. The residual dispersion curve is especially problematic for ultra long distance 10 Gbit/s systems or long distance 40 Gbit/s systems. This curvature is mainly due to the curvature of the DCF dispersion curve. Thus, matching only RDS is insufficient to compensate for dispersion over a specified bandwidth.

Another type of dispersion compensation is to carefully match the RDS of DCF to that of SMF. In place of RDS, the dispersion slope compensation ratio (DSCR), which is the ratio of RDS of DCF to transmission fibers is employed:

$$DSCR = S_{DCF}/D_{DCF} \times S_{SMF}/D_{SMF}$$

However, DSCR (and therefore RDS) is not a good measure for wideband compensation, and does not guarantee an acceptable solution for dispersion compensation over a relatively wide bandwidth.

In the past, less attention was focused on compensating the dispersion slope (the variation of dispersion with wavelength), as it was viewed as a second order effect. However, with the introduction of new transmission fibers (e.g., the Corning®; LEAF™; and Lucent.®. Truewave™ optical fibers) which are optimized for wideband WDM systems, the impact of relative dispersion slope has become more significant. This is because, in general, as RDS increases, the curvature and therefore the residual dispersion also increases. With these new fibers, the relative dispersion slope can be two or more times greater than that of a conventional single mode fiber, such as the Corning® SMF-28™ fiber. Therefore, as deployment of these new optical fibers progresses, there is a need for a cost-effective dispersion slope compensator to obtain accurate dispersion compensation over a relatively wide bandwidth.

SUMMARY OF THE INVENTION

The above-described issues and others are addressed by aspects of various embodiments of the present invention. One aspect of the present invention addresses a dispersion compensating module (DCM) and dispersion compensating fiber (DCF) for use in the DCM for controlling residual dispersion in a transmission system. The dispersion compensating fiber is designed with a dispersion curve having an inflection point at a wavelength near the optical transmission operating wavelengths. The dispersion curve, having an inflection point near the operating wavelength, produces a relative dispersion slope that closely matches the relative dispersion slope of the transmission fiber over a relatively wide bandwidth, around 40 nm or more, surrounding the operating wavelength range as addressed in greater detail below.

Additional features and advantages of the present invention will become apparent by reference to the following detailed description and accompanying drawings.

BRIEF DESCRIPTION OF THE DRAWINGS

FIG. 3 shows a cross section of a typical DCF.

FIG. 4 shows a refractive index (RI) profile for a DCF such as that illustrated in FIG. 3.

DETAILED DESCRIPTION

Figure 1:
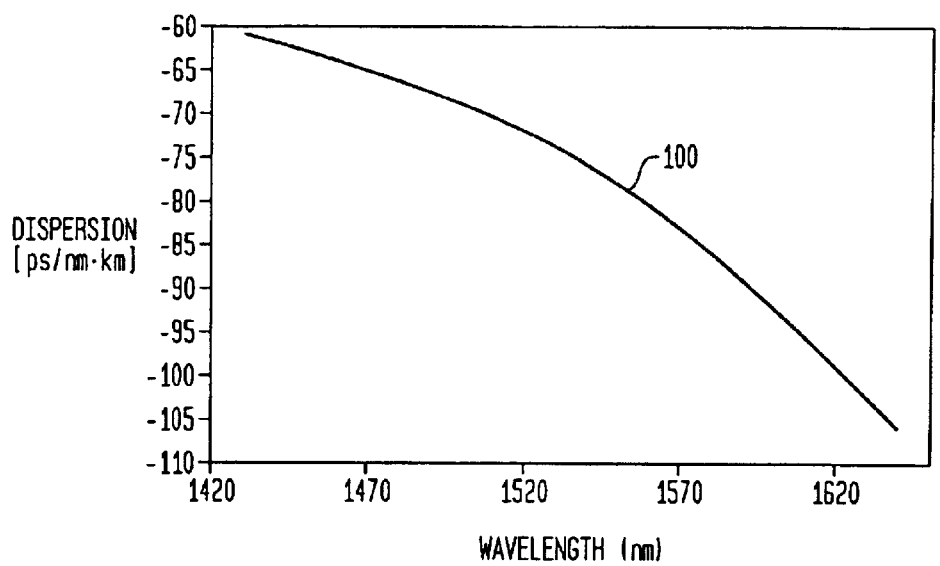
FIG. 1 shows a dispersion versus wavelength curve for a conventional dispersion compensating fiber (DCF).
Figure 2:
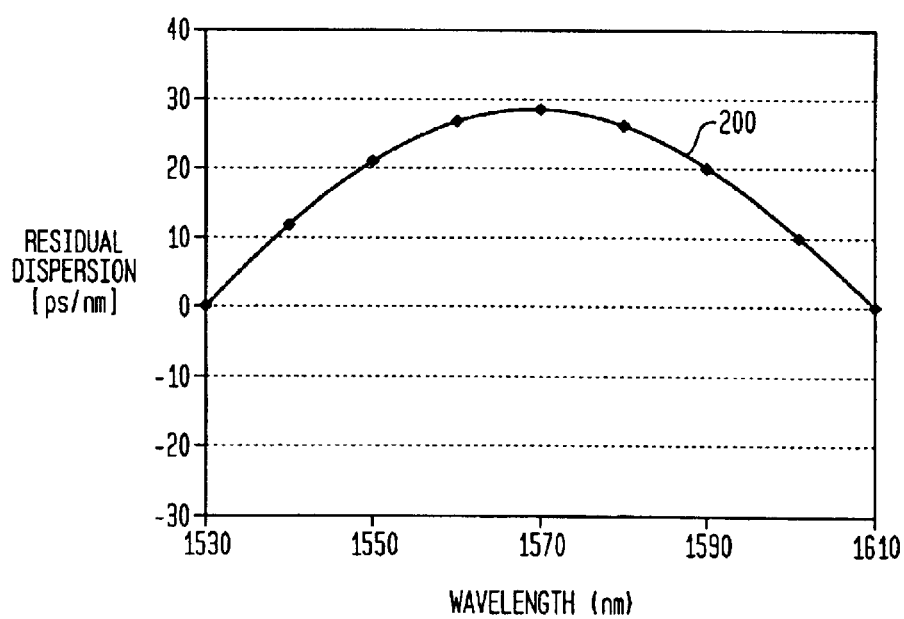
FIG. 2 shows a residual dispersion curve of a standard transmission fiber after dispersion compensation.

FIG. 3 shows a cross section of a DCF 300, and FIG. 4 shows a refractive index profile (RI) 400 corresponding to DCF 300 shown in FIG. 3. As shown in FIG. 3, the DCF includes a core 310 surrounded by cladding that includes first, second, and third cladding regions 311, 312, and 313. As shown in FIG. 4, the RI profile includes a central spike 422 corresponding to the DCF core 310, a trench 424 corresponding to the first cladding region 311, a ridge 426 corresponding to the second cladding region 312, and a flat section 428 corresponding to the third cladding region 313. DCF 300 and the RI profile illustrated in FIG. 4 are provided as illustration only. A DCF according to the present invention is not limited to this particular RI profile. Rather, as will be described in greater detail below, a DCF according to the present invention is designed to have a dispersion curve inflection point at a wavelength so as to provide dispersion compensation over a wide bandwidth around an operating wavelength.

Figure 5:
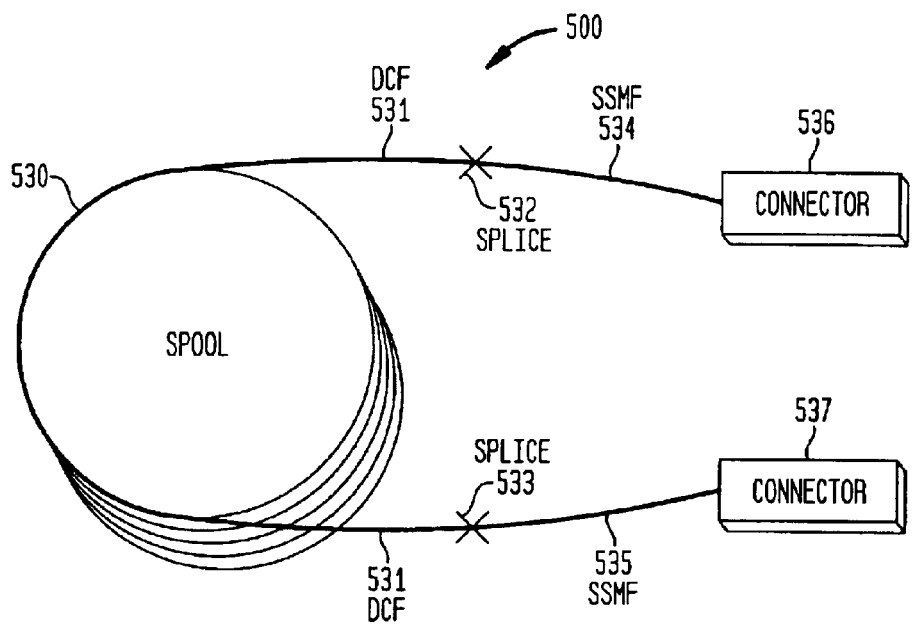
FIG. 5 shows in schematic form, a dispersion compensation module.

DCF 300 is typically fabricated from a silicon dioxide (SiO$_2$) based glass. The desired RI profile is achieved by doping the core 310 and cladding regions 311, 312, and 313, with suitable dopants. In one DCF design, the core 310 is doped with, for example, germanium (Ge), the first cladding region is doped with fluorine (F), and the second cladding region is doped with germanium and fluorine (G/F). Other doping materials may include phosphorus. This process produces a fiber structure comprised of two or more segments, each segment having inner and outer radii and a relative refractive index difference, Δ%. For a DCF according to the present invention, the radii and Δ% for each segment are chosen to provide the dispersion compensating fiber with a relative dispersion slope that substantially matches a relative dispersion slope of the transmission fiber near the 1.55 μm transmitting wavelength region DCF 300 is typically used in a Dispersion Compensating Module (DCM) 500, as illustrated in FIG. 5. DCM 500 includes a spool 530 around which several loops of DCF 531 is wound. The length of DCF 531 can vary, and could be several kilometers depending on the particular DCM design specifics. Also, DCF 531 could comprise of a single fiber, or several dispersion compensating fibers spliced together. Each end of DCF 531 is spliced at points 532, 533 to a standard single mode fiber SSMF 534, 535, which is in turn attached to a connector 536, 537. While FIG. 5 illustrates one embodiment of a DCM, the present invention is not limited to this particular arrangement. Rather, the present invention is directed to the DCF characteristics that would be employed in any type of DCM.

Figure 6:
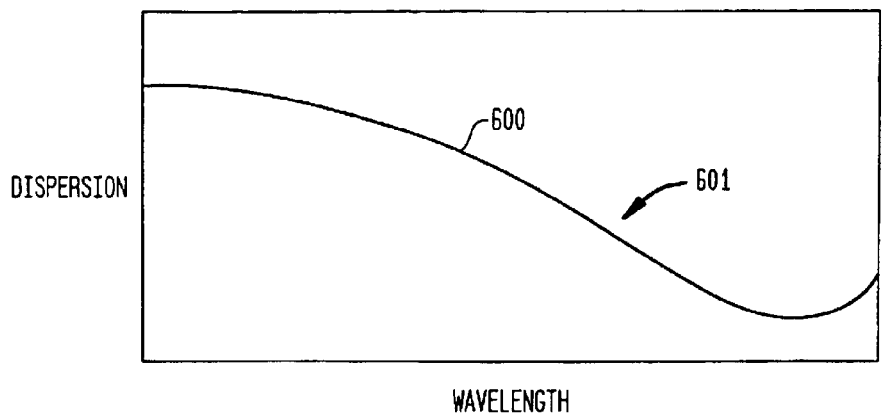
FIG. 6 shows a dispersion versus wavelength curve for a DCF according to the present invention.

Optical fiber designs with significant waveguide dispersion (as distinguished from material dispersion) exhibit the generic dispersion versus wavelength curve shown in FIG. 6. This curve has an inflection point 601, where the curvature changes from negative to positive, or in other words, where the $2^{nd}$ derivative is "0." The smallest residual dispersion occurs when the inflection point is within the operating wavelength range of the transmission fiber as addressed in greater detail below.

Figure 8:
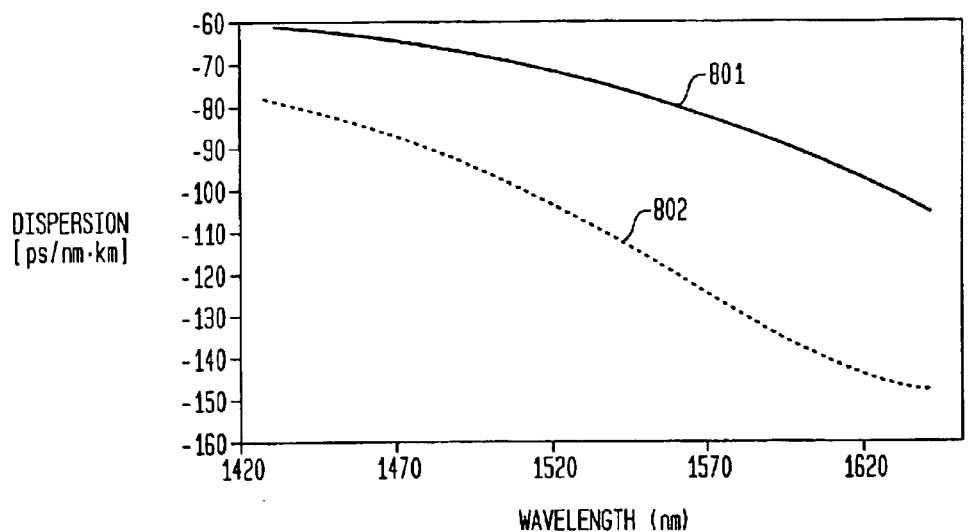
FIG. 8 illustrates measured dispersion of a standard DCF and a DCF according to a first embodiment of the present invention.

The generic dispersion curve in FIG. 6 depends very sensitively on the refractive index profile, such as that shown in FIG. 4. For many fiber designs, minor changes in the outer diameter of the fiber, which also changes the dimensions of the core and cladding radii, could cause the dispersion curve 600 to move appreciably both vertically and horizontally within the plot of FIG. 6. As an illustration, by changing the diameter of a fiber with a dispersion curve similar to curve 801 in FIG. 8, a curve similar to that of 802 can sometimes be obtain. The actual difference between 801 and 802 is more than simply a change in diameter, but FIG. 8 illustrates trends in curve movement. Often these changes are within the manufacturing tolerance of fiber fabrication. In practice, it is not sufficient to specify a fiber design, but the processing must be tuned by subtle control of the radii and indices to achieve the desired dispersion properties. As discussed below, such control is not necessary for conventional DCF.

Figure 7:
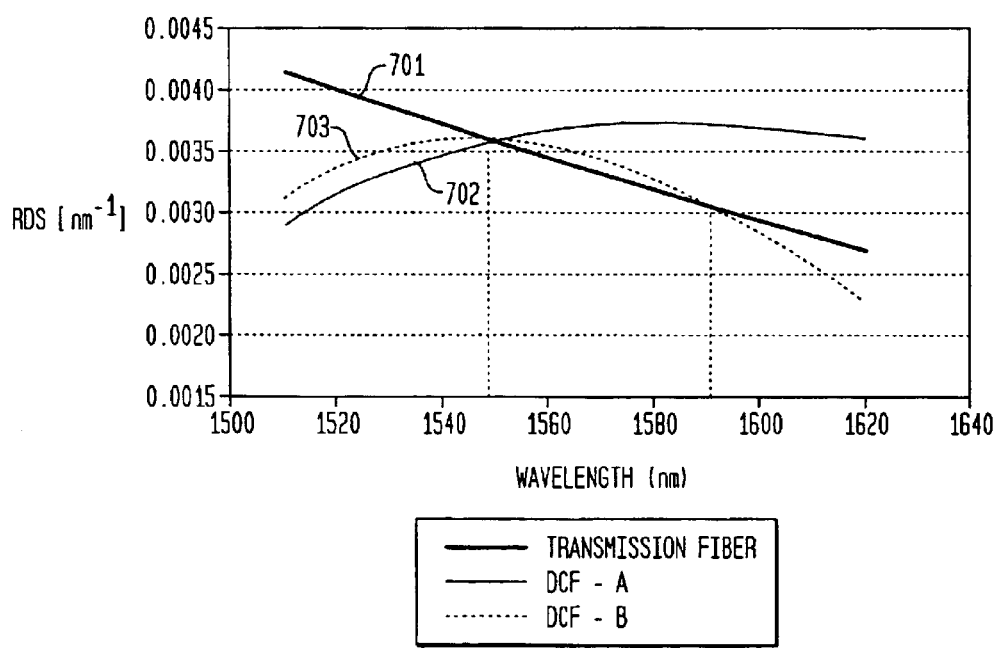
FIG. 7 illustrates a comparison of the relative dispersion slope (RDS) of a transmission fiber, a standard DCF, and a DCF according to the present invention.

The result of operating near the inflection point as shown in FIG. 6, can be seen in FIG. 7, which plots the RDS versus wavelength for SMF transmission fiber; the RDS of a "standard" DCF (DCF-A), such as that shown in FIG. 6; and a DCF designed according to the present invention (DCF-B), which has an inflection point near the 1.55 μm operating bandwidth of the SMF. The RDS of the SMF transmission fiber is shown as the thick solid line 701, the RDS of the DCF-A in the thin solid line 702, and the RDS of DCF-B in the dotted line 703. By designing DCF-B to have a dispersion curve with an inflection point near the 1.55 μm operating bandwidth, the RDS of DCF-B follows the RDS of the SMF more closely around the operating bandwidth 704 between about 1550 nm and 1590 nm, and, in fact crosses the RDS curve of the transmission fiber at two wavelengths near the desired wavelength transmission band. This fiber therefore compensates for residual dispersion over a significantly wider bandwidth than previously known DCF's.

In the past, use of dispersion compensating fibers having an inflection point in the 1550 nm region of dispersion curve was avoided due to extremely high sensitivity to manufacturing variation and extreme bend and splice loss. For example, small changes in the diameter of the fiber core can cause large changes in dispersion and dispersion slope. However, recent improvement in fabrication and fiber spooling conditions now makes it possible to work with these designs. The sensitivity can also be partly reduced by combining multiple dispersion compensating fibers in the module.

Figure 9:
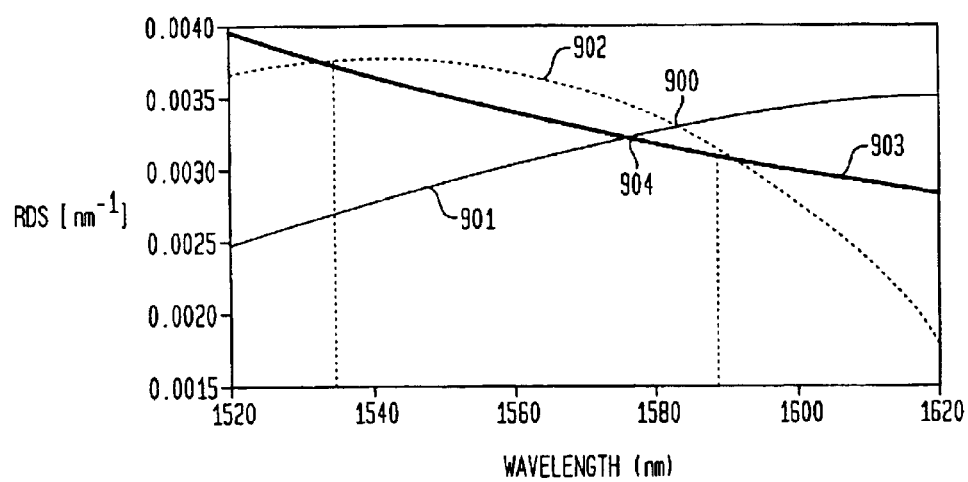
FIG. 9 illustrates a comparison of the RDS of the fibers of FIG. 8 against the RDS of a transmission fiber.

FIG. 8 illustrates graphically a curve 801 for the dispersion of a standard transmission fiber versus a curve 802 for another DCF designed according to the present invention where the RDS value is approximately 0.0035 nm$^{-1}$. FIG. 9 illustrates the RDS curves 901 and 902 corresponding to dispersion curves 801 and 802, respectively. In this case, the two fibers shown in FIG. 8 have approximately the same RDS at 1580 nm, which is shown as point 900 in FIG. 9, and are suitable for compensation of the SMF near that wavelength. As illustrated in FIG. 9, the RDS 901 of the typical dispersion compensating fiber, crosses the RDS curve 903 of the SMF at a single point 904 near the operating wavelength. However, the fiber according to the present invention, having an inflection point around 1550 nm, as shown in FIG. 9, the RDS curve 902 more readily matches the RDS curve 903 of the SMF across a much wider bandwidth, in this case over a range of about 1530 nm to 1590 nm, representing a 60 nm bandwidth in which dispersion compensation takes place.

Figure 10:
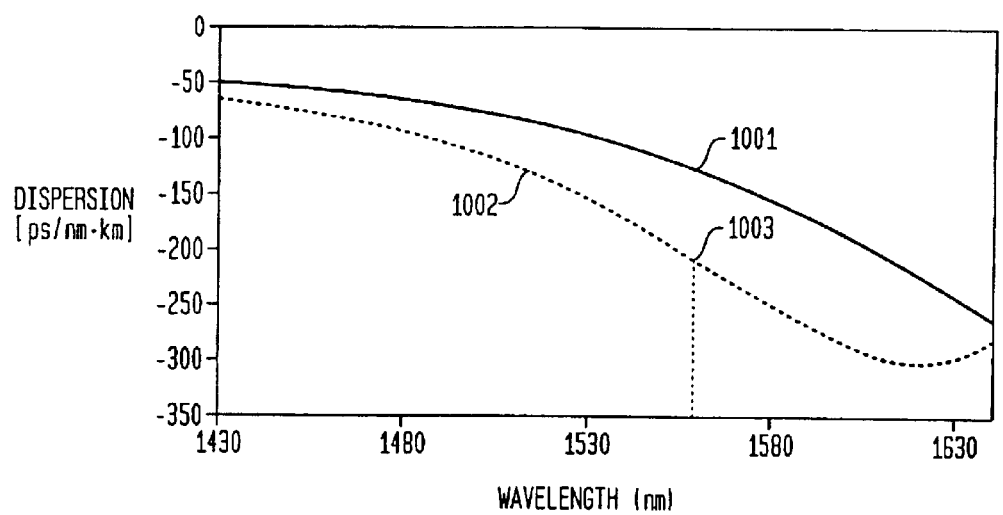
FIG. 10 illustrates measured dispersion of a standard DCF and a DCF according to a second embodiment of the present invention.
Figure 11:
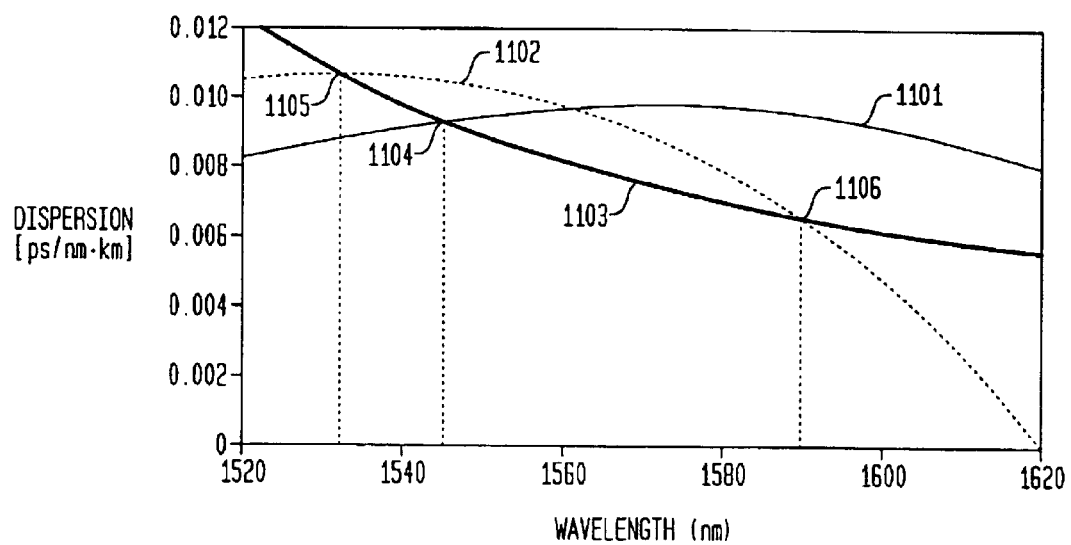
FIG. 11 illustrates a comparison of the RDS of the fibers of FIG. 10 against the RDS of a transmission fiber.

Achieving higher values of RDS is more difficult, but similar results can be achieved for RDS~0.01 nm$^{-1}$, as shown in FIG. 9 and FIG. 10. FIG. 9 illustrates a dispersion curve 1001 for a typical DCF, and a dispersion curve 1002 of a DCF according to the present invention, having an inflection point 1003 around 1570 nm. FIG. 11 illustrates the RDS curves corresponding to the dispersion curves of FIG. 10, where RDS curves 1101 and 1102 corresponding to dispersion curves 1001 and 1002, respectively. RDS curve 1103 represents the RDS curve for a standard SMF transmission fiber.

As seen in FIG. 11, RDS curve 1101 of a typical dispersion compensating fiber intersects RDS curve 1103 of the SMF at a single point 1104 at about 1540 nm. However, the RDS curve 1102 of the DCF according to the present invention, intersects RDS curve 1103 at two points around the 1550 nm operating wavelength, at point 1105 at about 1530 nm and at point 1106 at about 1590 nm. Thus, the RDS of the DCF according to the present invention relatively more closely matches the RDS of the SMF across a wider bandwidth, approximately 60 nm, even given the RDS~0.01 nm$^{-1}$.

Figure 12:
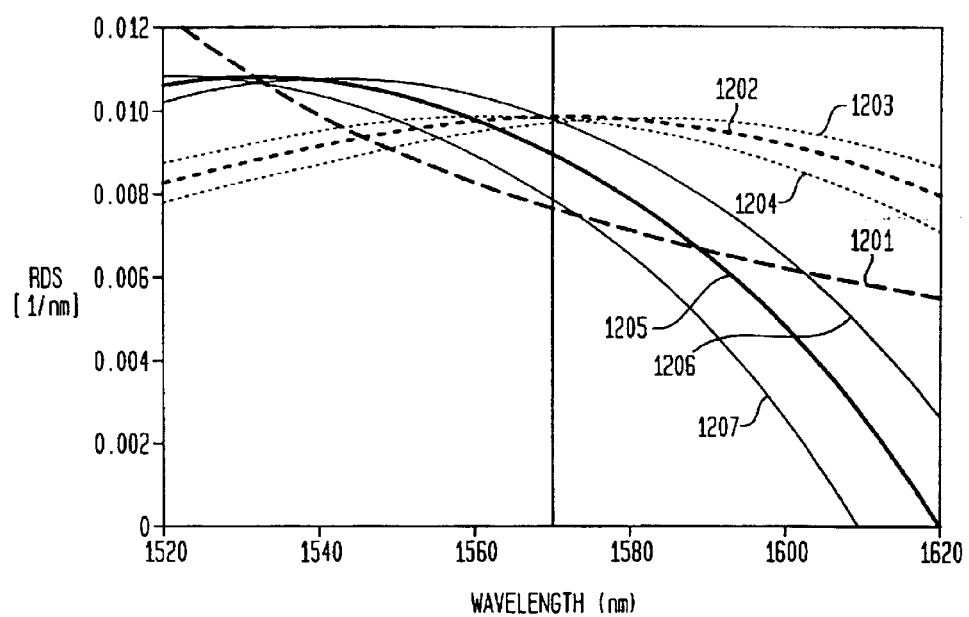
FIG. 12 illustrates the variations of the RDS value based variations in the dispersion fiber core diameter.

FIG. 12 illustrates the sensitivity of DCF designs which operate close to the 1550 nm inflection point. The long dashed curve 1201 is the RDS of non-zero dispersion fiber. The dotted curves 1202, 1203 and 1204 show the RDS of a conventional DCF, the dark dotted line 1202 indicating a nominal design and the surrounding lighter dotted curves 1203 and 1204 showing the result of ±1% variation in core diameter. The RDS does not vary by more than 0.001 nm$^{-1}$ across the wavelength band.

In contrast, the solid line curves 1205, 1206, and 1207 are comparative RDS curves for a fiber design with inflection point at 1570 nm. The dark solid line 1205 is a nominal design with lighter solid lines 1206 and 1207 representing ±1% variation in core diameter. Such minor variation results in change in RDS of 0.004 nm$^{-1}$. Only with advanced manufacturing procedures can such a high sensitivity be tolerated, and such designs have only recently become feasible. Given recent developments in manufacturing procedures, it may now be possible to operate at longer wavelengths along the characteristic dispersion curve as shown in FIG. 6.

It is increasingly more difficult to achieve dispersion compensation over wide wavelength regions as the RDS increases. One method currently used is to add a length of an additional fiber with different dispersion characteristics to effectively reduce the RDS. As an example, if a length of fiber with D=17 ps/nm-km and S=0.06 is added to a transmission span composed of fiber with D=4 and S=0.06, the composite RDS will be reduced because of the larger value of D. As can be seen in the RDS curves in FIG. 9, the trend of the transmission fiber and the DCFs are not well matched, even for operation near the inflection point. That is, the transmission fiber curve is concave up. One method of causing the RDS curve of the DCF to turn concave up is to design the DCF to operate near the minimum of the curve shown in FIG. 6 or to the long wavelength side where the dispersion slope is positive. By combined a length of fiber operating in this region with either a conventional one or one operating near the inflection point, even more precise dispersion compensation can be achieved.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A dispersion compensation module for an optical communication system having an operating bandwidth around a 1.55 μm nominal signal wavelength, comprising:
    an input port;
    an output port; and
    at least one predetermined length of dispersion compensating fiber connected to the input port and the output port, the dispersion compensating fiber being designed to have a dispersion slope inflection point at a wavelength near the 1.55 μm nominal signal wavelength of the optical communication system.

2. A dispersion compensation module according to claim 1 wherein the dispersion slope inflection point is within the operating bandwidth.

3. A dispersion compensation module according to claim 2, wherein the predetermined length of dispersion compensating fiber comprises a plurality of separate lengths of dispersion compensating fiber spliced together.

4. A dispersion compensating fiber for use in an optical communication system, wherein the dispersion compensating fiber is designed to have a relative dispersion slope curve that substantially matches a relative dispersion slope curve of a transmission fiber over a wavelength bandwidth around a 1.55 μm transmission wavelength,
    and wherein the dispersion compensating fiber is designed to have a dispersion slope inflection point at a wavelength near the 1.55 μm transmission wavelength.

5. A dispersion compensating fiber according to claim 4 wherein the wavelength bandwidth is more than 40 nm.

6. A dispersion compensating fiber according to claim 4, wherein the dispersion compensating fiber comprises a first dispersion compensating fiber and a second dispersion compensating fiber, each of the first and second dispersion compensating fibers having a relative dispersion slope curvature so that a combined dispersion slope curve of the first and second dispersion compensating fibers substantially matches the relative dispersion slope curve of a transmission fiber.

7. A dispersion compensating fiber for controlling residual dispersion in a 1.55 μm wavelength transmission fiber, wherein the dispersion compensating fiber has a core region designed to provide a dispersion slope having an inflection point at a wavelength near the 1.55 μm transmission wavelength.

8. A dispersion compensating fiber according to claim 7, wherein the inflection point is in a specified bandwidth about the 1.55 μm transmission wavelength.

9. A dispersion compensating fiber for a transmission fiber operating in a bandwidth around a 1.55 μm transmission wavelength, the dispersion compensating fiber comprising a core region comprised of two or more segments, each segment having a radii and a relative refractive index percent, Δ%:
    wherein the radii and Δ% for each segment are chosen to provide the dispersion compensating fiber with a dispersion slope having an inflection point at a wavelength near the 1.55 μm transmission wavelength.

10. A dispersion compensating fiber for controlling residual dispersion in a 1.55 μm wavelength transmission fiber, wherein the dispersion compensating fiber has a core region designed to provide a relative dispersion slope that substantially matches a relative dispersion slope of the transmission fiber over at least a 40 nm wavelength bandwidth near the 1.55 μm transmission wavelength, and wherein the dispersion compensating fiber is designed to have an inflection point within the 40 nm wavelength bandwidth.

11. A dispersion compensating fiber according to claim 10, wherein the relative dispersion slope in the dispersion compensating fiber intersects with the relative dispersion slope of the transmission fiber at two points near the 1.55 μm transmission wavelength.

12. A dispersion compensating fiber to compensate for dispersion in a transmission fiber operating near a 1.55 μm transmitting wavelength, the dispersion compensating fiber comprising a core region comprised of two or more segments, each segment having a radii and a relative refractive index percent, $\Delta\%$;

wherein the radii and $\Delta\%$ for each segment are chosen to provide the dispersion compensating fiber with a relative dispersion slope that substantially matches a relative dispersion slope of the transmission fiber near the 1.55 μm transmitting wavelength, and wherein the radii and $\Delta\%$ for each segment are chosen to provide the dispersion compensating fiber with a dispersion slope having an inflection point at a wavelength near the 1.55 μm transmitting wavelength.

13. A method for compensating for dispersion in an optical transmission line, comprising:

(a) mapping a relative dispersion slope for the optical communication line;

(b) specifying a transmission wavelength for the optical communication line;

(c) specifying an operating bandwidth around the transmission wavelength;

(d) designing a dispersion compensating module having a relative dispersion slope that matches the relative dispersion slope of the transmission fiber over the specified bandwidth and that has an inflection point within the specified bandwidth.

14. The method of claim 13, wherein the specified transmission wavelength is 1.55 μm.

15. The method of claim 14, wherein the operating bandwidth is at least 40 nm around the operating frequency.

16. The method of claim 13, wherein in step (d), the dispersion compensating module comprises a plurality of separate lengths of dispersion compensating fiber spliced together.

17. The method of claim 13, wherein in step (d), the dispersion compensating module comprises a dispersion compensating fiber having a core region including at least two segments, each segment having a radius and a relative refractive index percentage $\Delta\%$ chosen such that the dispersion compensating fiber has a relative dispersion slope that matches the relative dispersion slope of the transmission fiber over the specified bandwidth and that has an inflection point within the specified bandwidth.

18. The method of claim 13, wherein the dispersion compensating module has a relative dispersion slope that intersects the transmission line relative dispersion slope at two points around the operating wavelength.

* * * * *